United States Patent
Lee et al.

(10) Patent No.: US 11,307,610 B2
(45) Date of Patent: Apr. 19, 2022

(54) DISPLAY DEVICE

(71) Applicant: Samsung Display Co., LTD., Yongin-si (KR)

(72) Inventors: Duk Jin Lee, Suwon-si (KR); Beong Hun Beon, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 17/036,648

(22) Filed: Sep. 29, 2020

(65) Prior Publication Data

US 2021/0294379 A1   Sep. 23, 2021

(30) Foreign Application Priority Data

Mar. 18, 2020   (KR) .................. 10-2020-0033365

(51) Int. Cl.
  *G06F 1/16*   (2006.01)
  *G09F 9/30*   (2006.01)
  *G02B 5/30*   (2006.01)

(52) U.S. Cl.
  CPC ......... *G06F 1/1609* (2013.01); *G02B 5/3033* (2013.01); *G06F 1/1652* (2013.01); *G06F 1/1656* (2013.01); *G09F 9/301* (2013.01)

(58) Field of Classification Search
  CPC ..... G06F 1/1609; G06F 1/1652; G06F 1/1656
  See application file for complete search history.

(56) References Cited

U.S. PATENT DOCUMENTS

| | | | | |
|---|---|---|---|---|
| 6,124,907 A | * | 9/2000 | Jones | G02B 5/3033 349/96 |
| 7,532,283 B2 | * | 5/2009 | Yano | G02B 5/3083 349/117 |
| 7,732,024 B2 | * | 6/2010 | Mazaki | G02B 5/3016 428/1.3 |
| 8,045,131 B2 | * | 10/2011 | Uesaka | G02F 1/13363 349/191 |
| 2004/0100600 A1 | * | 5/2004 | Takeuchi | G02B 5/3016 349/117 |

(Continued)

FOREIGN PATENT DOCUMENTS

| | | |
|---|---|---|
| KR | 10-0757785 | 9/2007 |
| KR | 10-1080020 | 11/2011 |

(Continued)

*Primary Examiner* — Adrian S Wilson
(74) *Attorney, Agent, or Firm* — Kile Park Reed & Houtteman PLLC

(57) ABSTRACT

A display device may comprise a display panel including one surface at a front side of the display panel and another surface at a rear side of the display panel, a front stacked structure disposed on the surface of the display panel, and a rear stacked structure disposed on the another surface of the display panel. The front stacked structure may include a polarizing member disposed on the surface of the display panel, and an impact absorbing layer disposed on the polarizing member. The polarizing member may include at least one phase retardation layer disposed on the surface of the display panel, a polarization layer disposed between the at least one phase retardation layer and the impact absorbing layer, and a first polarization protection layer disposed between the polarization layer and the impact absorbing layer.

20 Claims, 17 Drawing Sheets

(56) References Cited

U.S. PATENT DOCUMENTS

| | | | | |
|---|---|---|---|---|
| 2008/0043332 A1* | 2/2008 | Chiba | ............ | G02B 5/3033 |
| | | | | 359/489.03 |
| 2009/0066888 A1* | 3/2009 | Kunai | ............ | G02B 5/305 |
| | | | | 349/96 |
| 2010/0085522 A1* | 4/2010 | Uesaka | ............ | G02F 1/13363 |
| | | | | 349/119 |
| 2010/0171916 A1* | 7/2010 | Mazaki | ............ | G02B 5/3016 |
| | | | | 349/127 |
| 2011/0116021 A1* | 5/2011 | Araki | ............ | G02B 6/0056 |
| | | | | 349/96 |
| 2013/0249378 A1* | 9/2013 | Murakami | ............ | G02B 27/286 |
| | | | | 313/112 |

FOREIGN PATENT DOCUMENTS

| | | |
|---|---|---|
| KR | 10-1758432 | 7/2017 |
| KR | 10-1884737 | 8/2018 |
| KR | 10-1915110 | 11/2018 |

* cited by examiner

Before Stretching

After Stretching

FIG.9

|  | TU94 | NRF |
|---|---|---|
| Thickness | 23um | 40um |
| Elongation Rate | 1:1.3~1.5 | 1:1.1 |
| Phase Difference(RO) | 900~1400nm | 200~600nm |

DISPLAY DEVICE

CROSS-REFERENCE TO RELATED APPLICATION(S)

This application claims priority to and benefits of Korean Patent Application No. 10-2020-0033365 35 U.S.C. § 119, filed on Mar. 18, 2020 in the Korean Intellectual Property Office, the entire contents of which are incorporated herein by reference.

BACKGROUND

1. Technical Field

The disclosure relates to a display device.

2. Description of the Related Art

Electronic apparatuses providing images to users, such as a smartphone, a tablet PC, a digital camera, a laptop computer, a navigation device, and a smart television, include display devices for displaying images.

Recently, a foldable display device has attracted much attention. A foldable display device having a wide screen with good portability has advantages of both a smartphone and a tablet PC.

SUMMARY

Aspects of the disclosure provide a display device with improved white angular dependency (WAD).

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment, a display device may comprise a display panel including a surface at a front side of the display panel and another surface at a rear side of the display panel, a front stacked structure disposed on the surface of the display panel; and a rear stacked structure disposed on the another surface of the display panel. The front stacked structure may include a polarizing member disposed on the surface of the display panel, and an impact absorbing layer disposed on the polarizing member. The polarizing member may include at least one phase retardation layer disposed on the surface of the display panel, a polarization layer disposed between the at least one phase retardation layer and the impact absorbing layer, and a first polarization protection layer disposed between the polarization layer and the impact absorbing layer. An angle between an absorption axis of the polarization layer and a phase retardation axis of the impact absorbing layer may be in a range of about −10 degrees to about 10 degrees.

In an embodiment, the polarization layer may have a rectangular shape having long sides extending along a first direction and short sides extending along a second direction intersecting the first direction. The absorption axis of the polarization layer may extend in a direction between the first direction and the second direction.

In an embodiment, the impact absorbing layer may be formed through a film stretching process.

In an embodiment, the film stretching process may include a first stretching for stretching the impact absorbing layer along one direction, and a second stretching for stretching the impact absorbing layer along another direction.

In an embodiment, a first elongation rate of the first stretching may be less than a second elongation rate of the second stretching.

In an embodiment, a refractive index of the impact absorbing layer in the other direction may be greater than a refractive index of the impact absorbing layer in the one direction.

In an embodiment, the phase retardation axis of the impact absorbing layer may be the same as the another direction of the second stretching in the film stretching process.

In an embodiment, the at least one phase retardation layer may include a first phase retardation layer disposed between the surface of the display panel and the polarization layer. The first phase retardation layer may retard a phase of incident light by $\lambda/4$, where $\lambda$ is a wavelength of the incident light.

In an embodiment, the at least one phase retardation layer may include a second phase retardation layer disposed between the first phase retardation layer and the polarization layer, and the second phase retardation layer may retard a phase of incident light by $\lambda/2$.

In an embodiment, the polarizing member may further include a second polarization protection layer disposed between the polarization layer and the phase retardation layer.

In an embodiment, the front stacked structure may further include a cover window disposed on the impact absorbing layer.

In an embodiment, the rear stacked structure may include a lower flexible film disposed on the another surface of the display panel, and a cushion layer spaced apart from the display panel, the lower flexible film being disposed between the cushion layer and the display panel.

In an embodiment, the rear stacked structure may further include at least one metal plate spaced apart from the lower flexible film, the cushion layer being disposed between the at least one metal plate and the lower flexible film.

In an embodiment, the display device may further include a folding area, a first unfolding area at a side of the folding area in the first direction, and a second unfolding area at another side of the folding area in the first direction.

In an embodiment, the at least one metal plate may include a first metal plate disposed in the first unfolding area and a second metal plate disposed in the second unfolding area. The first metal plate and the second metal plate may be spaced apart from each other, and the folding area is disposed between the first metal plate and the second metal plate.

According to another embodiment, a display device may comprise a display panel including a surface at a front side of the display panel and another surface at a rear side of the display panel, a front stacked structure disposed on the surface of the display panel, and a rear stacked structure disposed on the another surface of the display panel. The front stacked structure may include a polarizing member disposed on the surface of the display panel, and an impact absorbing layer disposed on the polarizing member. The polarizing member may include at least one phase retardation layer disposed on the surface of the display panel, a polarization layer disposed between the at least one phase retardation layer and the impact absorbing layer, and a polarization protection layer disposed between the polarization layer and the impact absorbing layer. An angle between an absorption axis of the polarization layer and a phase retardation axis of the impact absorbing layer may be in a range of about 80 degrees to about 100 degrees.

In an embodiment, the polarization layer may have a rectangular shape having long sides extending along a first direction and short sides extending along a second direction intersecting the first direction. The absorption axis of the polarization layer may extend in a direction between the first direction and the second direction.

In an embodiment, the impact absorbing layer may be formed through a film stretching process.

In an embodiment, the film stretching process may include a first stretching for stretching the impact absorbing layer along one direction, and a second stretching for stretching the impact absorbing layer along another direction. A first elongation rate of the first stretching may be less than a second elongation rate of the second stretching.

In an embodiment, a refractive index of the impact absorbing layer in the other direction may be greater than a refractive index of the impact absorbing layer in the one direction. The phase retardation axis of the impact absorbing layer is may be the same as the another direction of the second stretching in the film stretching process.

According to a display device according to an embodiment, it is possible to improve white angular dependency (WAD) by adjusting an absorption axis of a polarization layer and a phase retardation axis of an impact absorbing layer.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which:

FIG. 9 is a table showing the specifications of a first sample (Sample #1, TU94) and a second sample (Sample #2, NRF) of an impact absorbing layer

DETAILED DESCRIPTION OF THE EMBODIMENTS

Figure 1:
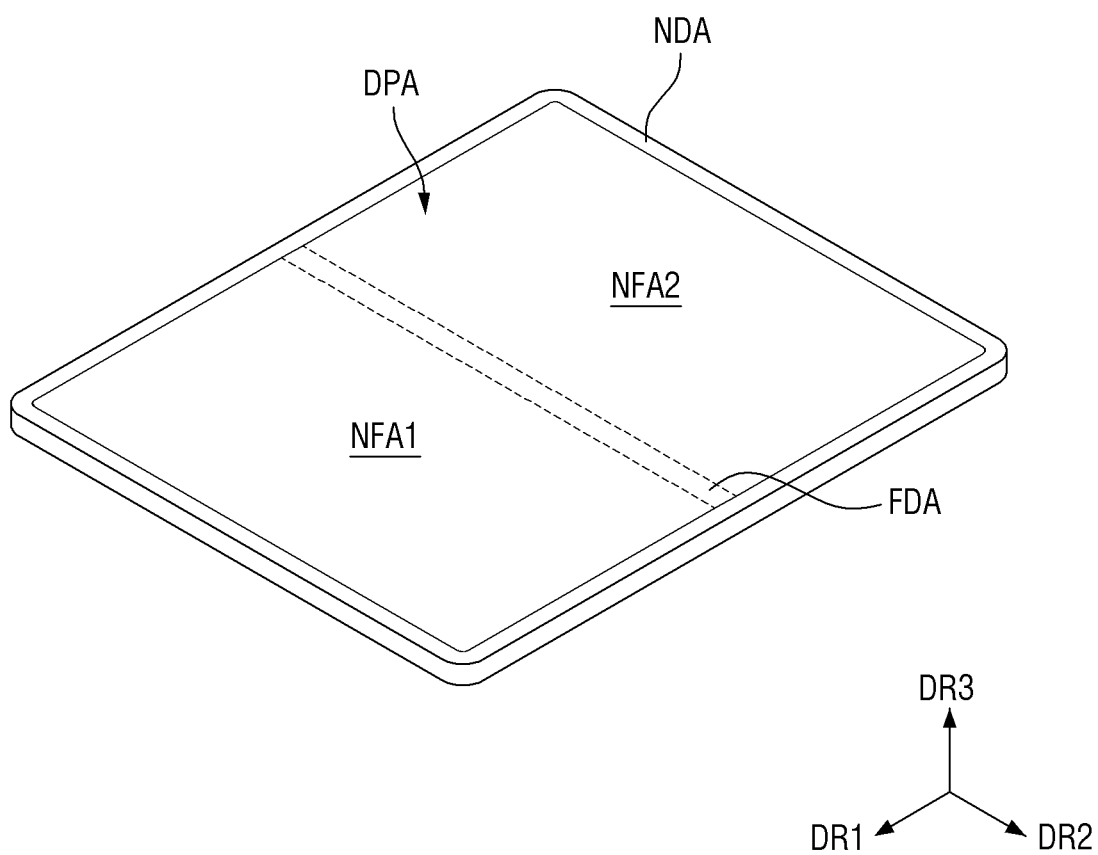
FIG. 1 is a perspective view of a display device according to an embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. For example, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or". Throughout the disclosure, the expression "at least one of A, B, and C" may indicate only A, only B, only C, both A and B, both A and C, both B and C, all of A, B, and C, or variations thereof.

The term "at least one of" is intended to include the meaning of "at least one selected from the group consisting of" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be further understood that the terms "comprises," "comprising," "includes," "including," "have," "having," "contains," and/or "containing" when used in this specification, are intended to specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described with reference to the attached drawings.

Figure 2:
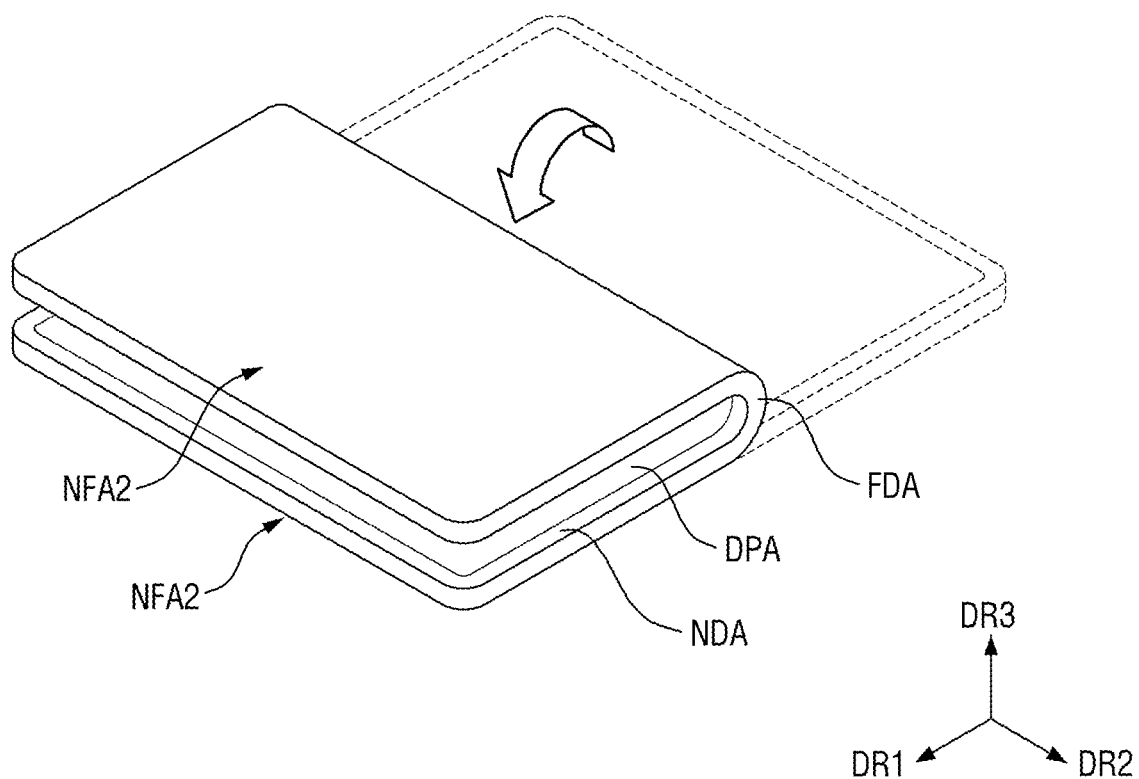
FIG. 2 is a perspective view showing the display device of FIG. 1 in a folded state.

FIG. 1 is a perspective view of a display device according to an embodiment. FIG. 2 is a perspective view showing the display device of FIG. 1 in a folded state.

Referring to FIGS. 1 and 2, a display device 10 displays a screen or an image through a display portion DPA, and various devices including the display portion DPA may be included therein. Examples of the display device 10 may include, but are not limited to, a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various household appliances such as a refrigerator and a washing machine including the display portion DPA, an Internet-of-Things device, and the like. A typical example of a foldable display device to be described later may be a foldable smartphone, tablet PC, or laptop computer, but is not limited thereto.

The display device 10 may have a substantially rectangular shape in plan view. The display device 10 may have a rectangular shape with right-angled or rounded corners in plan view. The display device 10 may include four sides or edges. The display device 10 may include long sides and short sides.

The display device 10 may include a surface and another surface. At least one of the surface or the another surface of the display device 10 may be a display surface. In an embodiment, the display surface may be at the surface of the display device 10 and display may not be performed on the another surface. Hereinafter, such an embodiment will be mainly described, but the display device may be a double-sided display device in which display is performed on both the surface and the another surface.

The display device 10 may be divided into a display portion DPA displaying an image or video and a non-display portion NDA disposed around the display portion DPA, in plan view, according to whether display is performed.

The display portion DPA may include pixels. The pixel is a basic unit for displaying a screen. The pixels may include, but not limited to, a red pixel, a green pixel, and a blue pixel. The pixels may further include a white pixel. The pixels may be alternately arranged in plan view. For example, the pixels may be arranged in a matrix, but the disclosure is not limited thereto.

The non-display portion NDA may be disposed around the display portion DPA. The non-display portion NDA may surround the display portion DPA. In an embodiment, the display portion DPA may be formed in a rectangular shape, and the non-display portion NDA may be disposed around four sides of the display portion DPA, but the disclosure is not limited thereto. A black matrix may be disposed on the non-display portion NDA to prevent light emitted from adjacent pixels from leaking out.

The display device 10 may be a foldable device. As used herein, the term "foldable device" refers to a device which can be folded and is used to mean not only a folded device but also a device that can have both a folded state and an unfolded state. Further, the folding may typically include folding at an angle of about 180 degrees. However, the disclosure is not limited thereto, and it may include a case where the folding angle exceeds 180 degrees or is less than 180 degrees, for example, a case where the folding angle is above 90 degrees or less than 180 degrees, or a case where the folding angle is above 120 degrees or less than 180 degrees. It may be referred to as a folded state if folding is performed out of the unfolded state, even if complete folding is not performed. For example, even if it is folded at an angle of 90 degrees or less, as long as the maximum folding angle becomes 90 degrees or more, it may be expressed as being in a folded state to distinguish it from the unfolded state. During the folding, the radius of curvature (see 'R' in FIG. 4) may be equal to or less than about 5 mm, but is not limited thereto. For example, the radius of curvature may be in a range of about 1 mm to about 2 mm, or about 1.5 mm, but is not limited thereto.

The display device 10 may be folded with respect to a folding area FDA. The folding area FDA may be a folding line or a folding axis, but the disclosure is not limited thereto. The folding area FDA may have a straight linear shape extending in one direction in plan view. Although the drawing illustrates a case where the folding area FDA extends parallel to the short side of the display device 10, the disclosure is not limited thereto. The folding area FDA may be parallel to the long side or may be inclined with respect to the short side and the long side.

In one embodiment, the folding area FDA of the display device 10 may be determined at a specific location. One or two or more folding areas FDA may be determined at a specific location(s) in the display device 10. In another embodiment, the location of the folding area FDA may not be specified in the display device 10 and may be freely set in various areas.

The display device 10 may be divided into a first unfolding area NFA1 and a second unfolding area NFA2 by the folding area FDA. The first unfolding area NFA1 may be at a side of the folding area FDA, and the second unfolding area NFA2 may be at another side of the folding area FDA. When the folding area FDA is determined at a specific location, the first unfolding area NFA1 and the second unfolding area NFA2 may be specified as an area in which folding is not performed. The specified first unfolding area NFA1 and second unfolding area NFA2 may have a same width, but are not limited thereto. When the folding area FDA is not specified, the first unfolding area NFA1 and the second unfolding area NFA2 may be changed according to a position where the folding area FDA is set.

The display portion DPA of the display device 10 may be disposed over both the first unfolding area NFA1 and the second unfolding area NFA2. Further, the display portion DPA may even be at the folding area FDA corresponding to a boundary between the first unfolding area NFA1 and the second unfolding area NFA2. For example, the display portion DPA of the display device 10 may be continuously disposed irrespective of boundaries of the unfolding areas NFA1 and NFA2, the folding area FDA, and the like. However, the disclosure is not limited thereto, and the display portion DPA may be disposed in the first unfolding area NFA1, but the display portion DPA may not be disposed in the second unfolding area NFA2. The display portion DPA may be disposed in the first unfolding area NFA1 and the second unfolding area NFA2, but the display portion DPA may not be disposed in the folding area FDA.

Figure 12:
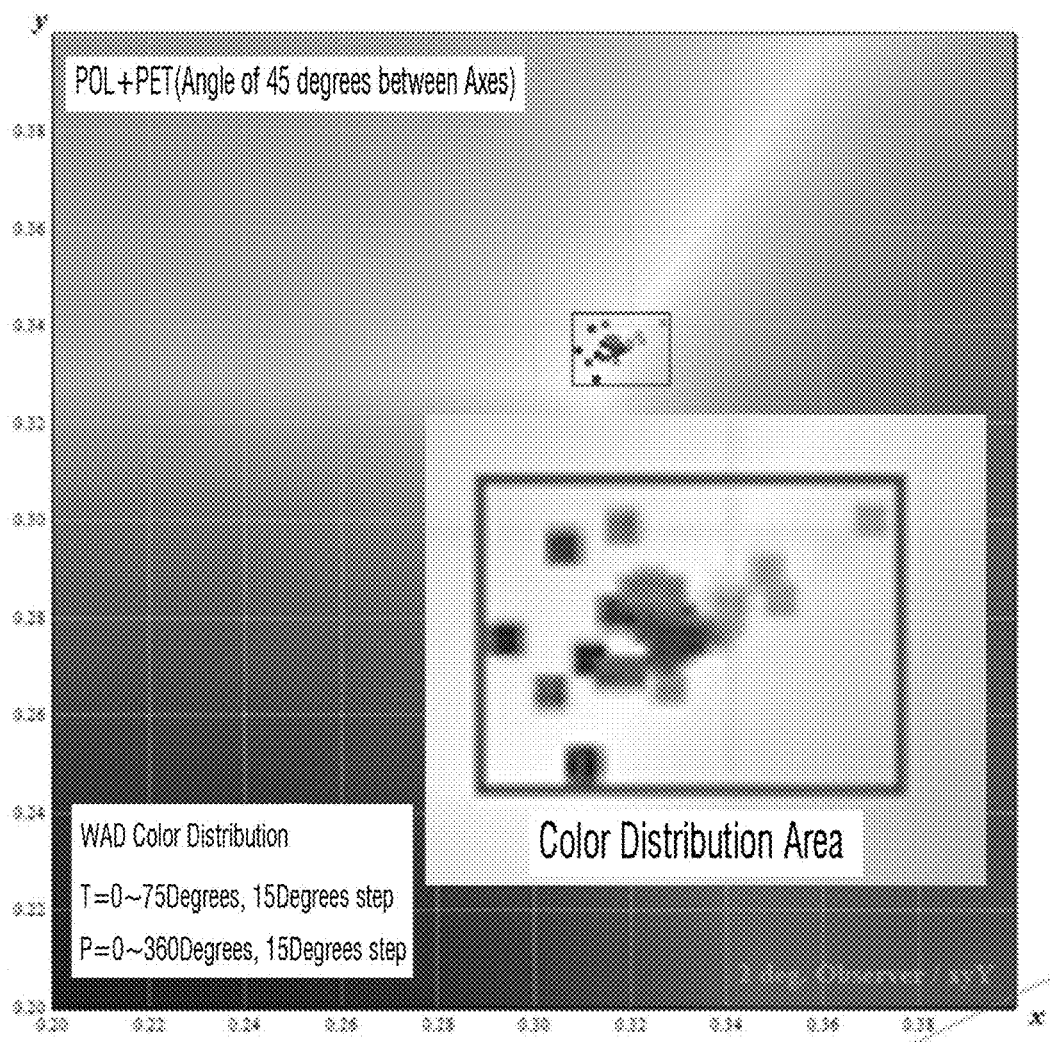
FIG. 12 is a graph that shows color coordinates when an angle between the absorption axis of the linear polarization layer and the phase retardation axis of the impact absorbing layer is 45 degrees.

The display device 10 may be folded in an in-folding manner in which the display surface is folded inward such that the inside surfaces face each other (as illustrated in FIG. 2), or folded in an out-folding manner in which the display surface is folded outward (as illustrated in FIG. 12). The display device 10 may be folded in only one manner, i.e., an in-folding manner or out-folding manner. Both the in-folding and the out-folding may be performed. In the case of the display device 10 in which both in-folding and out-folding are performed, in-folding and out-folding may be performed with respect to the same folding area FDA. The display device 10 include folding area FDA, such as a folding area FDA for in-folding only and a folding area FDA for out-folding only, which are used to perform different types of folding.

In one embodiment, the display device 10 may include a display panel, a layer, a panel, and a substrate stacked thereon, which have flexibility, and the display device 10 may be folded by folding all the members. In embodiments, at least a portion of the display panel or the members stacked thereon may have a separate shape with respect to the folding area FDA. In this case, the separated member located in the unfolding area may not have a flexible property.

Figure 3:
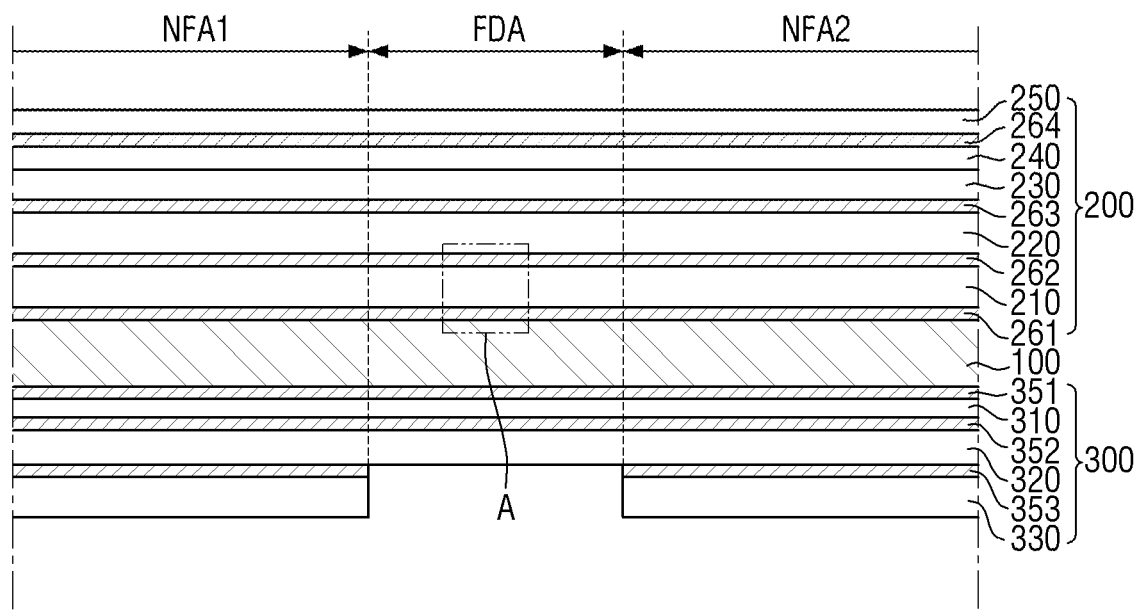
FIG. 3 is a schematic cross-sectional view of a display device in an unfolded state according to an embodiment.
Figure 4:
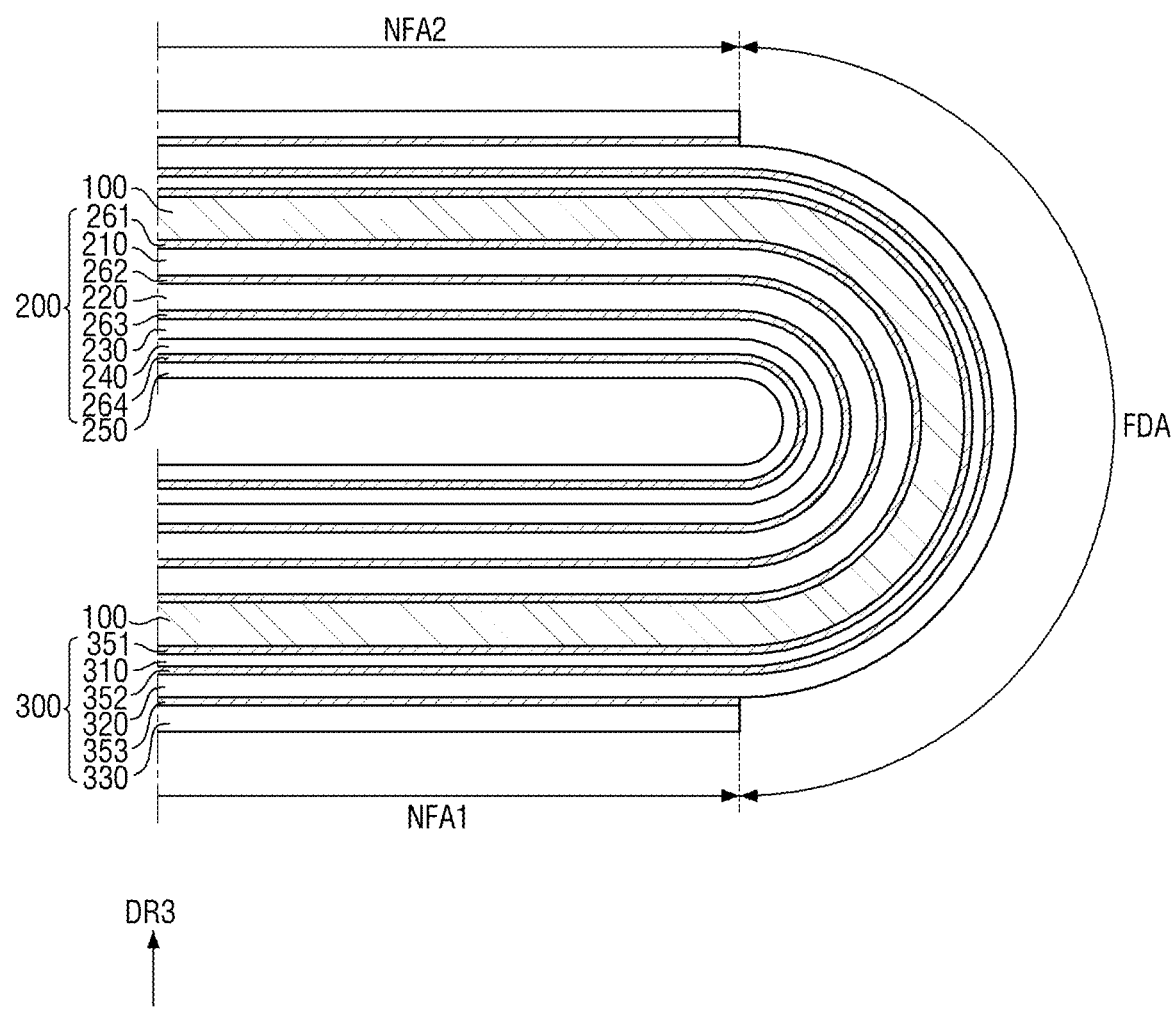
FIG. 4 is a schematic cross-sectional view of a display device in a folded state according to an embodiment.

FIG. 3 is a schematic cross-sectional view of a display device in an unfolded state according to an embodiment. FIG. 4 is a schematic cross-sectional view of a display device in a folded state according to an embodiment.

Referring to FIGS. 3 and 4, the display device 10 may include a display panel 100, a front stacked structure 200 disposed on a front side of the display panel 100, and a rear stacked structure 300 disposed on a rear side of the display panel 100.

Each of the stacked structures 200 and 300 may include at least one coupling member 261 to 264 and 351 to 353. The front side of the display panel 100 refers to a side on which the display panel 100 displays a screen, and the rear side refers to the opposite side of the front side. A surface of the display panel 100 may be at the front side, and another surface of the display panel 100 may be at the rear side.

The display panel 100 is a panel for displaying a screen or an image. Examples of the display panel 100 may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel, and a cathode ray tube (CRT) display panel, but also a light receiving display panel such as a liquid crystal display (LCD) panel and an electrophoretic display (EPD) panel. Hereinafter, an organic light emitting display panel will be described as an example of the display panel 100, and the organic light emitting display panel applied to the embodiment will be simply referred to as the display panel 100 unless special distinction is required. However, the embodiment is not limited to the organic light emitting display panel, and other display panels mentioned above or known in the art may be applied within the scope of the same technical ideas.

The display panel 100 may further include a touch member. The touch member may be provided as a panel or film separate from the display panel 100 and attached onto the display panel 100, but may also be provided in the form of a touch layer inside the display panel 100. In the embodiments, a case in which the touch member is provided inside the display panel 100 and included in the display panel 100 is illustrated, but the disclosure is not limited thereto.

Figure 5:
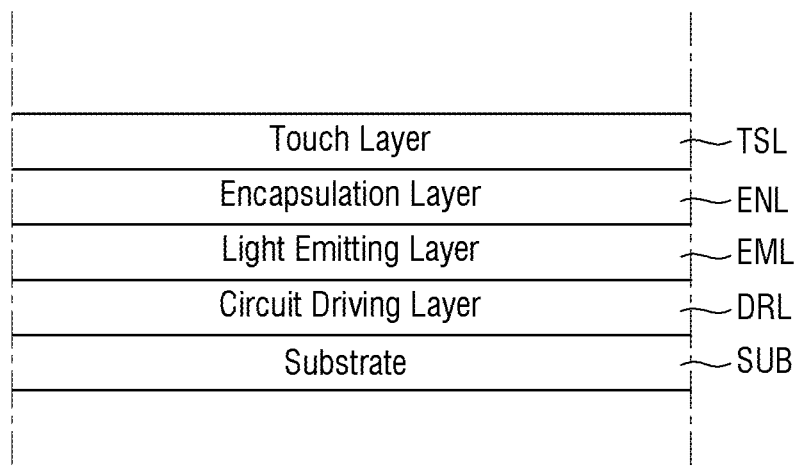
FIG. 5 is a schematic cross-sectional view of a display panel according to an embodiment.

FIG. 5 is a schematic cross-sectional view of a display panel according to an embodiment. Referring to FIG. 5, the display panel 100 may include a substrate SUB, a circuit driving layer DRL on the substrate SUB, a light emitting layer EML on the circuit driving layer DRL, and an encapsulation layer ENL on the light emitting layer EML, and a touch layer TSL on the encapsulation layer ENL.

The substrate SUB may be a flexible substrate including a flexible polymer material, such as polyimide or the like. Accordingly, the display panel 100 can be bent, folded, or rolled. In some embodiments, the substrate may include sub-substrates overlapping in a thickness direction with a barrier layer interposed therebetween. In this case, each sub-substrate may be a flexible substrate.

The circuit driving layer DRL may be disposed on the substrate SUB. The circuit driving layer DRL may include a circuit that drives the light emitting layer EML of the pixel. The circuit driving layer DRL may include thin film transistors.

The light emitting layer EML may be disposed on the circuit driving layer DRL. The light emitting layer EML may include an organic light emitting layer. The light emitting layer EML may emit light with various luminance levels according to a driving signal transmitted from the circuit driving layer DRL.

The encapsulation layer ENL may be disposed on the light emitting layer EML. The encapsulation layer ENL may include an inorganic layer or a laminated layer of an inorganic layer and an organic layer.

The touch layer TSL may be disposed on the encapsulation layer ENL. The touch layer TSL is a layer for recognizing a touch input, and may function as a touch member. The touch layer TSL may include sensing areas and sensing electrodes.

Referring again to FIGS. 3 and 4, the front stacked structure 200 is disposed on a surface at a front side of the display panel 100. The front stacked structure 200 may include a polarizing member 210, an impact absorbing layer 220, a cover window 230, and a cover window protection layer 250, which are sequentially stacked forward from the display panel 100.

The polarization member 210 polarizes the light passing therethrough. The polarization member 210 may serve to reduce the reflection of external light. In one embodiment, the polarizing member 210 may be a polarizing film.

Figure 6:
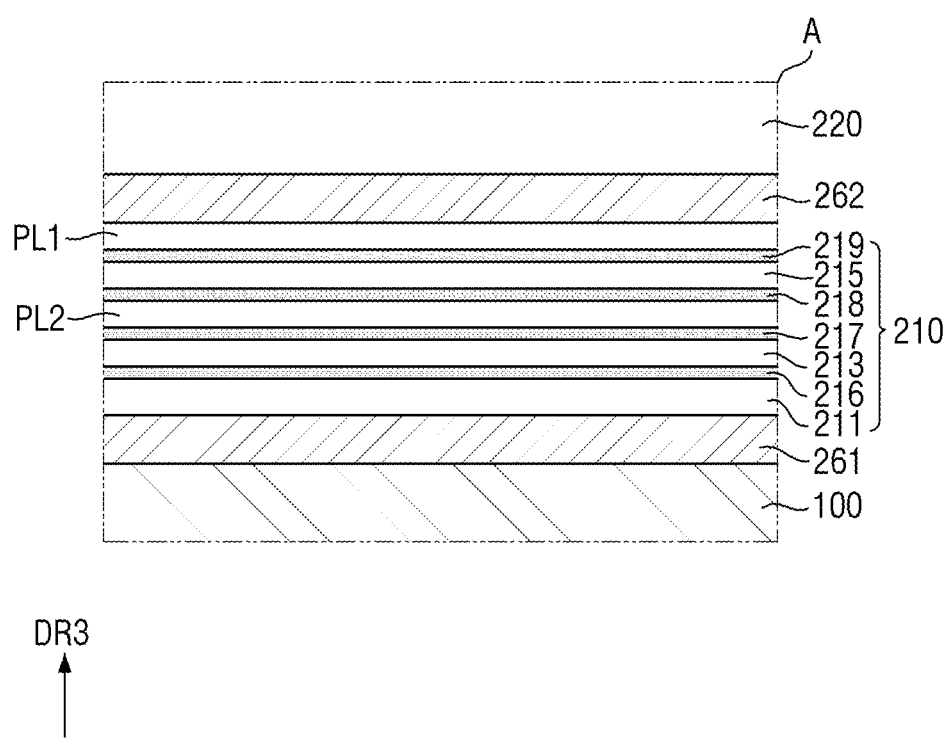
FIG. 6 is an enlarged schematic cross-sectional view of region A of FIG. 3.

FIG. 6 is an enlarged schematic cross-sectional view of region A of FIG. 3.

Referring to FIGS. 3 and 6, the polarizing member 210 may include at least one phase retardation layer and a polarization layer 215 on the phase retardation layer. The polarization layer 215 may include a linear polarizer. For example, the polarization layer 215 may be a linear polarization layer.

The phase retardation layer may include a first phase retardation layer 211 between the surface of the display panel 100 and the polarization layer 215, and a second phase retardation layer 213 between the first phase retardation layer 211 and the polarization layer 215.

The first phase retardation layer 211 may retard a phase of light incident on the first phase retardation layer 211 by $\lambda/4$ (where $\lambda$ is a wavelength of the incident light), and the second phase retardation layer 213 may retard a phase of light incident on the second phase retardation layer 213 by $\lambda/2$. For example, the second phase retardation layer 213 may be a half wave plate (HWP), and the first phase retardation layer 211 may be a quarter wave plate (QWP).

The light provided from the display panel 100 may be phase-retarded by $\lambda/4$ in the first phase retardation layer 211 and phase-retarded by $\lambda/2$ in the second phase retardation layer 213. The light provided from the second phase retardation layer 213 may be linearly polarized in the polarization layer 215.

The polarizing member 210 may further include polarization protection layers PL1 and PL2 with the polarization layer 215 disposed therebetween.

The polarization layer 215 may include a polyvinyl alcohol film. The polarization layer 215 may be stretched in one direction. The stretching direction of the polarization layer 215 may be an absorption axis, and a direction perpendicular thereto may be a transmission axis.

The polarization protection layers PL1 and PL2 may be respectively disposed on a surface and another surface of the polarization layer 215. For example, the first polarization protection layer PL1 may be disposed between the polarization layer 215 and the impact absorbing layer 220, and the second polarization protection layer PL2 may be disposed between the polarization layer 215 and the second phase retardation layer 213. The polarization protection layers PL1 and PL2 may be made of cellulose resin such as triacetyl cellulose, or polyester resin, but are not limited thereto.

Coupling members 216, 217, 218 and 219 may be disposed between the respective members 211, 213, PL2, 215 and PL1 of the polarizing member 210. The coupling members 216, 217, 218 and 219 may be optically transparent. For example, each of the coupling members 216, 217, 218 and 219 may be an optically clear adhesive or optically clear resin, but is not limited thereto.

Referring again to FIGS. 3 and 4, the impact absorbing layer 220 may be disposed on the polarizing member 210. The impact absorbing layer 220 may serve to prevent an external impact (e.g., an impact applied from above the cover window 230) from being transmitted to the display panel 100.

The thickness of the impact absorbing layer 220 may be in a range of about 20 μm to about 40 μm, but is not limited thereto.

The impact absorbing layer 220 may include a plastic material. The impact absorbing layer 220 may include, for example, polyimide (PI), polyethylene terephthalate (PET), polycarbonate (PC), polyethylene (PE), polypropylene (PP), polysulfone (PSF), polymethylmethacrylate (PMMA), triacetylcellulose (TAC), cycloolefin polymer (COP) or the like.

The impact absorbing layer 220 may include a material in which a filler is dispersed in the above-mentioned plastic material. For example, the impact absorbing layer 220 may include the plastic material mentioned above and a filler dispersed in the plastic material.

The filler is a filler well known in the art, and may be selected from materials that can be applied. For example, the filler may be selected from materials having a smaller modulus than the plastic material of the impact absorbing layer 220.

The filler may include particles having any one of a spherical shape, a plate shape, and a cylindrical shape, but its shape is not limited thereto.

The impact absorbing layer 220 may further include a filler, thereby providing flexibility to the impact absorbing layer 220. Accordingly, the impact resistance may be further improved.

The cover window 230 may be disposed on the polarizing member 210. In an embodiment, the cover window 230 may be disposed on the impact absorbing layer 220. The cover window 230 serves to protect the display panel 100. The cover window 230 may be made of a transparent material. The cover window 230 may include, for example, glass or plastic.

When the cover window 230 includes glass, the glass may be ultra thin glass (UTG) or thin glass. When the glass is ultra thin glass or thin glass, it may have a flexible property such that it can be bent, folded, or rolled. The thickness of the glass may be in a range of about 10 µm to about 300 µm. For example, the thickness of the glass may be in a range of about 30 µm to about 80 µm, or about 50 µm. The glass of the cover window 230 may include soda-lime glass, alkali aluminosilicate glass, borosilicate glass, or lithium alumina silicate glass. The glass of the cover window 230 may include chemically strengthened or thermally strengthened glass to have strong rigidity. Chemical strengthening may be achieved through an ion exchange process in alkaline salts. The ion exchange process may be performed two or more times.

When the cover window 230 includes plastic, it may be more advantageous to exhibit flexible properties such as folding. Examples of plastics applicable to the cover window 230 may include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyarylate (PAR), triacetyl cellulose (TAC), and cellulose acetate propionate (CAP). The plastic cover window 230 may be formed to include one or more of the plastic materials mentioned above.

In order to prevent the surface of the cover window 230 from being scratched, a hard coating layer 240 may be formed on the surface of the cover window 230. In embodiments, without providing the hard coating layer 240, an anti-fingerprint layer may be formed on the surface of the cover window 230.

The cover window protection layer 250 may be disposed on the cover window 230. The cover window protection layer 250 may perform at least one of functions of prevention of scattering, impact absorption, prevention of scratch, prevention of fingerprint smudges and prevention of glare on the cover window 230. The cover window protection layer 250 may include a transparent polymer film. The transparent polymer film may include at least one of polyethylene terephthalate (PET), polyethylene naphthalate (PEN), polyether sulfone (PES), polyimide (PI), polyarylate (PAR), polycarbonate (PC), polymethyl methacrylate (PMMA), or cycloolefin copolymer (COC). The front stacked structure 200 may include front coupling members 261 to 264 for coupling adjacent stacked members. For example, a first front coupling member 261 may be disposed between the display panel 100 and the first phase retardation layer 211 to couple them, a second front coupling member 262 may be disposed between the first polarization protection layer PL1 and the impact absorbing layer 220 to couple them, a third front coupling member 263 may be disposed between the impact absorbing layer 220 and the cover window 230 to couple them, and a fourth front coupling member 264 may be disposed between the hard coating layer 240 and the cover window protection layer 250 to couple them.

The front coupling members 261 to 264 may all be optically transparent.

The rear stacked structure 300 may be disposed on another surface at a rear side of the display panel 100. The rear stacked structure 300 may include a polymer film layer 310, a cushion layer 320, and a metal plate 330, which are sequentially stacked rearward from the display panel 100.

The polymer film layer 310 may include a polymer film. The polymer film layer 310 may include, for example, polyimide (PI), polyethylene terephthalate (PET), polycarbonate (PC), polyethylene (PE), polypropylene (PP), polysulfone (PSF), polymethylmethacrylate (PMMA), triacetylcellulose (TAC), cycloolefin polymer (COP) or the like. The polymer film layer 310 may include a functional layer on at least one surface thereof. The functional layer may include, for example, a light absorbing layer. The light absorbing layer may include a light absorbing material such as a black pigment or dye. The light absorbing layer may be formed by coating or printing black ink on a polymer film.

The cushion layer 320 may be disposed on the polymer film layer 310. The cushion layer 320 may include a foam material. The cushion layer 320 may be disposed in the folding area FDA and the non-folding areas NFA1 and NFA2. In some embodiments, the cushion layer 320 may include a groove recessed toward the display surface in the folding area FDA, but is not limited thereto.

The metal plate 330 may be disposed on the cushion layer 320. The metal plate 330 may include at least one metal plate. The metal plate 330 serves to diffuse heat generated from the display panel 100 or other parts of the display device 10. The metal plate 330 may include metal. The metal may include metal having excellent thermal conductivity, such as copper and silver. The metal plate 330 may be a heat dissipation sheet including graphite or carbon nanotubes.

The metal plate 330 is not limited thereto, but the at least one metal plate may include a first metal plate and a second metal plate, which may be separated by the folding area FDA to facilitate folding of the display device 10 as illustrated in FIGS. 3 and 4. For example, the first metal plate may be disposed in the first unfolding area NFA1, and the second metal plate may be disposed in the second unfolding area NFA2. The first metal plate and the second metal plate may be physically separated from each other with the folding area FDA disposed between the first metal plate and the second metal plate.

The rear stacked structure 300 may include rear coupling members 351 to 353 for coupling adjacent stacked members. For example, a first rear coupling member 351 may be disposed between the display panel 100 and the polymer film layer 310 to couple them, a second rear coupling member 352 may be disposed between the polymer film layer 310 and the cushion layer 320 to couple them, and a third rear coupling member 353 may be disposed between the cushion layer 320 and the metal plate 330 to couple them. When the metal plate 330 is separated by the folding area FDA, the third rear coupling member 353 may also be separated into the same shape. However, the disclosure is not limited thereto, and the third rear coupling member 353 may be formed in one piece without being separated for each of the unfolding areas NFA1 and NFA2.

When the display device 10 performs display only on the front surface, the rear coupling members 351 to 353 are not necessarily optically transparent, unlike the front coupling members 261 to 264.

Figure 7:
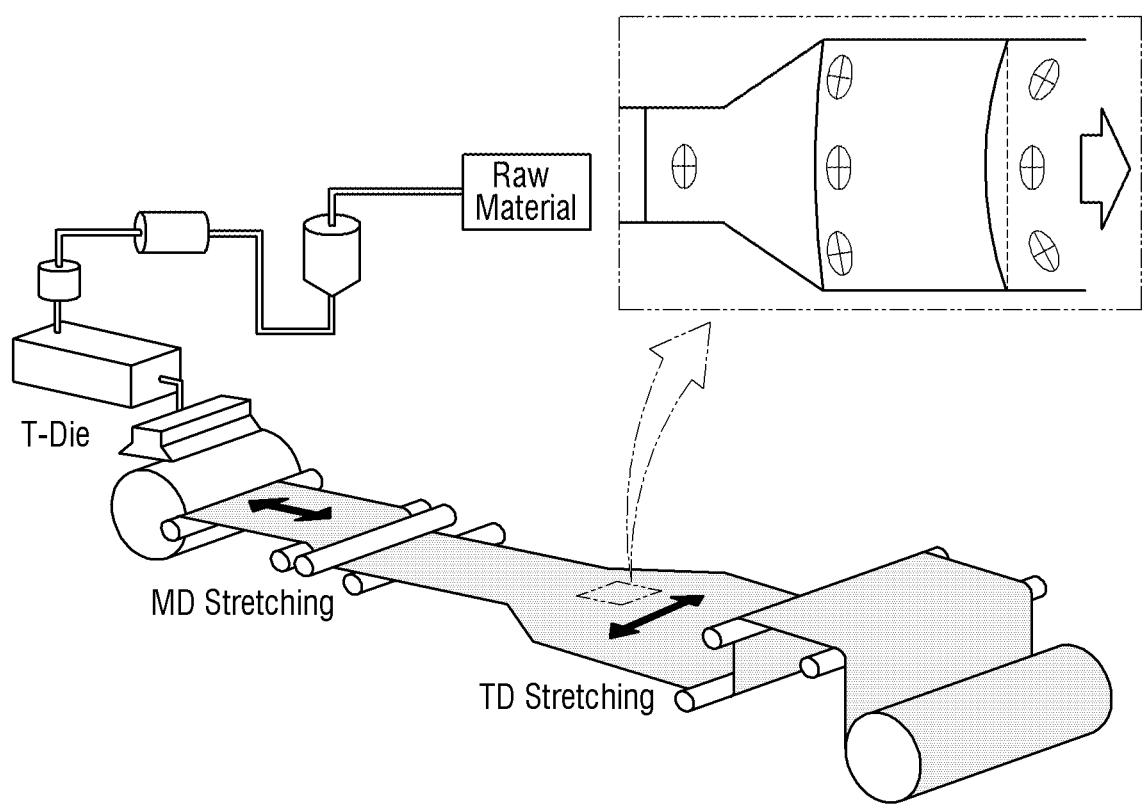
FIG. 7 is a schematic view showing the manufacture of an impact absorbing layer according to an embodiment.
Figure 8:
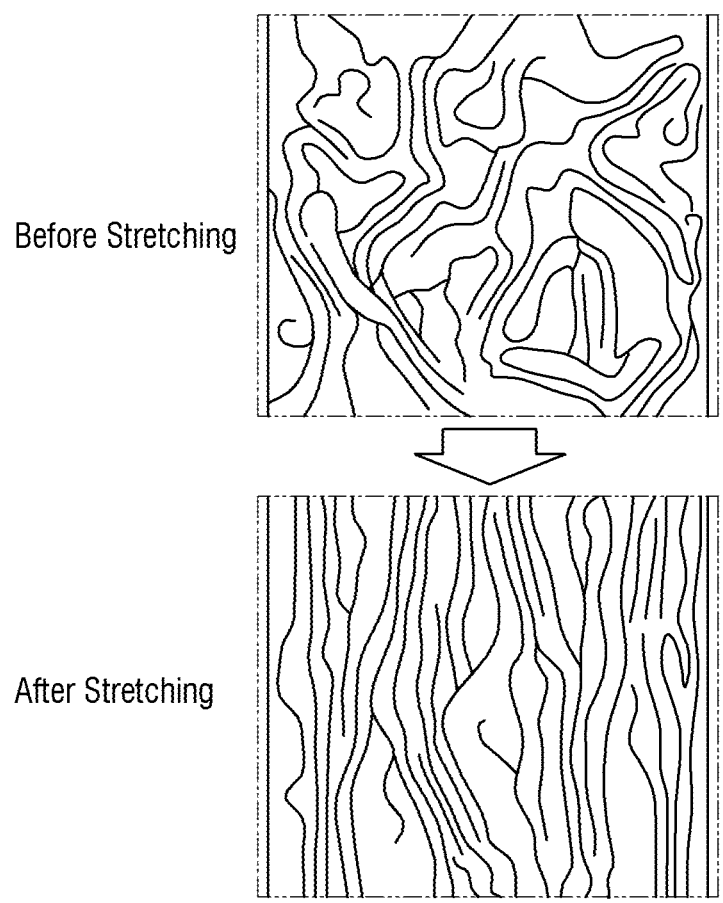
FIG. 8 is a view showing material arrangements of an impact absorbing layer before and after a second stretching according to an embodiment.

FIG. 7 is a schematic view showing the manufacture of an impact absorbing layer according to an embodiment. FIG. 8 is a view showing material arrangements of an impact absorbing layer before and after a second stretching according to an embodiment. FIG. 9 is a table showing the specifications of a first sample (Sample #1, TU94) and a second sample (Sample #2, NRF) of an impact absorbing layer.

Referring to FIGS. 7 to 9, the impact absorbing layer 220 according to an embodiment may be formed through a first stretching (MID stretching) and a second stretching (TD stretching). Specifically, an impact absorbing layer material (e.g., raw material) may be provided as a film material to an extrusion unit (T-Die) from a supply unit. The film material may be subjected to a first stretching (MD stretching) along one direction, and second stretching (TD stretching) along the other direction different from the one direction. The elongation rate of the first stretching (MD stretching) may be, for example, about 1, and the elongation rate of the second stretching (TD stretching) may be, for example, about 1.3 to about 1.5. In embodiments, the elongation rate of the second stretching (TD stretching) may be, for example, about 1.1. In an embodiment, the elongation rate of the second stretching (TD stretching) may be greater than the elongation rate of the first stretching (MD stretching). By the second stretching (TD stretching), the internal material arrangement of the impact absorbing layer 220 may have a shape extending in the other direction, which is the direction of the second stretching (TD stretching), as shown in FIG. 8.

The thickness of the first sample (Sample #1, TU94) having an elongation rate of about 1.3 to about 1.5 in the second stretching (TD stretching) may be about 23 μm, and the thickness of the second sample (Sample #2, NRF) having an elongation rate of about 1.1 in the second stretching (TD stretching) may be about 40 μm.

The refractive index in the other direction, which is the direction of the second stretching (TD stretching), may be greater than the refractive index in the one direction, which is the direction of the first stretching (MD stretching). The refractive index due to stretching may generally be proportional to the elongation rate. In the impact absorbing layer 220, as described above, since the refractive index in the other direction and the refractive index in the one direction are different from each other, a phase difference RO may occur. The phase difference RO may be proportional to a difference between the refractive index in the other direction and the refractive index in the one direction. In the first sample (Sample #1), since the difference in refractive index is greater than that of the second sample (Sample #2), the phase difference RO may have a larger value (about 900 to about 1400 nm for the first sample (Sample #1), and about 200 to about 600 nm for the second sample (Sample #2)). The other direction, which is the direction of the second stretching (TD stretching) having a larger elongation rate, may form a phase retardation axis. In other words, the phase retardation axis of the impact absorbing layer 220 according to an embodiment may be the other direction.

Lights having a red wavelength (about 630~780 nm), a green wavelength (495~570 nm), and a blue wavelength (450~495 nm) may be provided in an outward direction from the display panel 100. The lights having a red wavelength (about 630~780 nm), a green wavelength (495~570 nm), and a blue wavelength (450~495 nm) from the display panel 100 may have different phase difference changes because the refractive index in the other direction, which is the direction of the second stretching (TD stretching), is greater than the refractive index in the one direction, which is the direction of the first stretching (MD stretching), thereby causing the phase difference RO, as described above. The lights of the red wavelength (about 630~780 nm), the green wavelength (495~570 nm) and the blue wavelength (450~495 nm) having different phase difference changes may have different polarization states (polarization state difference between them).

The light entering the impact absorbing layer 220 may have a different reflectance depending on the polarization state. Accordingly, the lights of the red wavelength (about 630~780 nm), the green wavelength (495~570 nm) and the blue wavelength (450~495 nm) having different polarization states may have different reflectances, and thus, may have different transmittances.

When the lights of the red wavelength (about 630~780 nm), the green wavelength (495~570 nm) and the blue wavelength (450~495 nm) have different transmittances, non-uniformity of white angular dependency (WAD) may occur between the lights of the red wavelength (about 630~780 nm), the green wavelength (495~570 nm) and the blue wavelength (450~495 nm) seen by external users.

Figure 10:
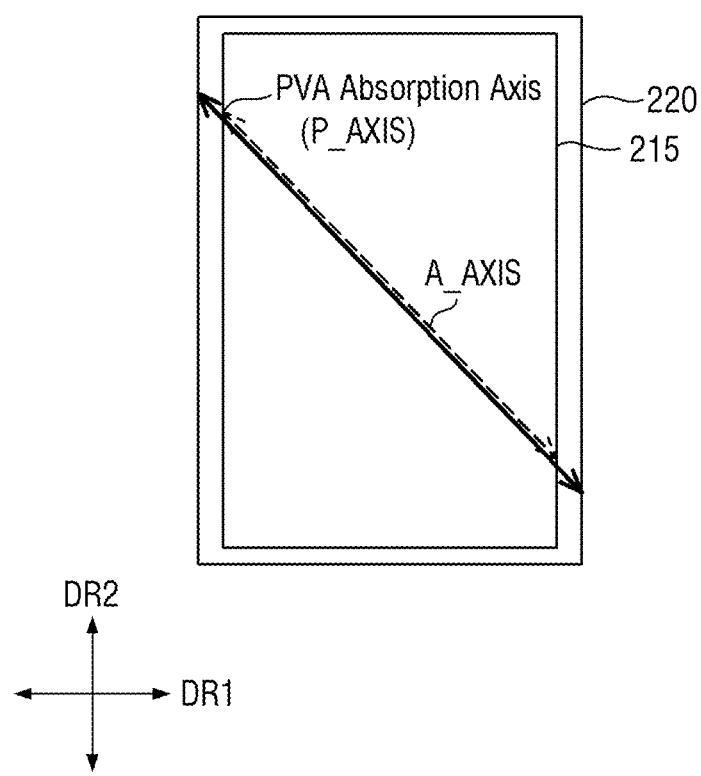
FIG. 10 is a plan view showing a relationship between a phase retardation axis of an impact absorbing layer and an absorption axis of a linear polarization layer according to an embodiment.

FIG. 10 is a plan view showing a relationship between a phase retardation axis of an impact absorbing layer and an absorption axis of a linear polarization layer according to an embodiment.

In the display device 10 according to the embodiment, the polarization layer 215 may have an absorption axis A_AXIS extending in a direction between the first direction DR1 and the second direction DR2, and the impact absorbing layer 220 may have a phase retardation axis P_AXIS extending in a direction between the first direction DR1 and the second direction DR2.

The absorption axis A_AXIS extends in the direction between the first direction DR1 and the second direction DR2, thereby allowing the light transmitted through the polarization layer 215 to reach a user wearing a device with linear polarization in a direction parallel to, e.g., the first direction DR1 or the second direction DR2. For example, the absorption axis A_AXIS may have an angle in a range of about 40 degrees to about 60 degrees with respect to the first direction DR1, but is not limited thereto.

The angle between the phase retardation axis P_AXIS and the absorption axis A_AXIS may be in a range of about −10 degrees to about 10 degrees. For example, the angle between the phase retardation axis P_AXIS and the absorption axis A_AXIS may be about zero (0) degrees. In other words, the direction of the phase retardation axis P_AXIS and the direction of the absorption axis A_AXIS may be the same or parallel to each other.

When the angle between the phase retardation axis P_AXIS and the absorption axis A_AXIS is in a range of about −10 degrees to about 10 degrees, even if the linearly polarized light transmitted through the polarization layer 215 and provided from the display panel (see '100' in FIG. 3) passes through the impact absorbing layer 220, a substantially linear polarization state may be maintained.

As described above, the lights of the red wavelength (about 630~780 nm), the green wavelength (495~570 nm) and the blue wavelength (450~495 nm) may be provided in an outward direction from the display panel 100. The lights of the red wavelength (about 630~780 nm), the green wavelength (495~570 nm) and the blue wavelength (450~495 nm) from the display panel 100 may have different phase difference changes because the refractive index in the other direction, which is the direction of the second stretching (TD stretching), is greater than the refractive index in the one direction, which is the direction of the first stretching (MD stretching), thereby causing the phase difference RO, as described above. The lights of the red wavelength (about 630~780 nm), the green wavelength (495~570 nm) and the blue wavelength (450~495 nm) having different phase difference changes may have different polarization states (polarization state difference between them).

However, as in the embodiment, when the angle between the phase retardation axis P_AXIS and the absorption axis A_AXIS is in a range of about −10 degrees to about 10 degrees, even if the linearly polarized light transmitted through the polarization layer 215 and provided from the display panel (see '100' in FIG. 3) passes through the impact absorbing layer 220, a substantially linear polarization state may be maintained.

Accordingly, the lights of the red wavelength (about 630~780 nm), the green wavelength (495~570 nm) and the blue wavelength (450~495 nm) not having different polarization states may have substantially a same reflectance, and thus, may have a same transmittance. Therefore, the lights of the red wavelength (about 630~780 nm), the green wavelength (495~570 nm) and the blue wavelength (450~495 nm) may have different transmittances, thereby preventing non-uniformity of white angular dependency (WAD) from occurring between the lights of the red wavelength (about 630~780 nm), the green wavelength (495~570 nm) and the blue wavelength (450~495 nm) seen by external users.

Figure 11:
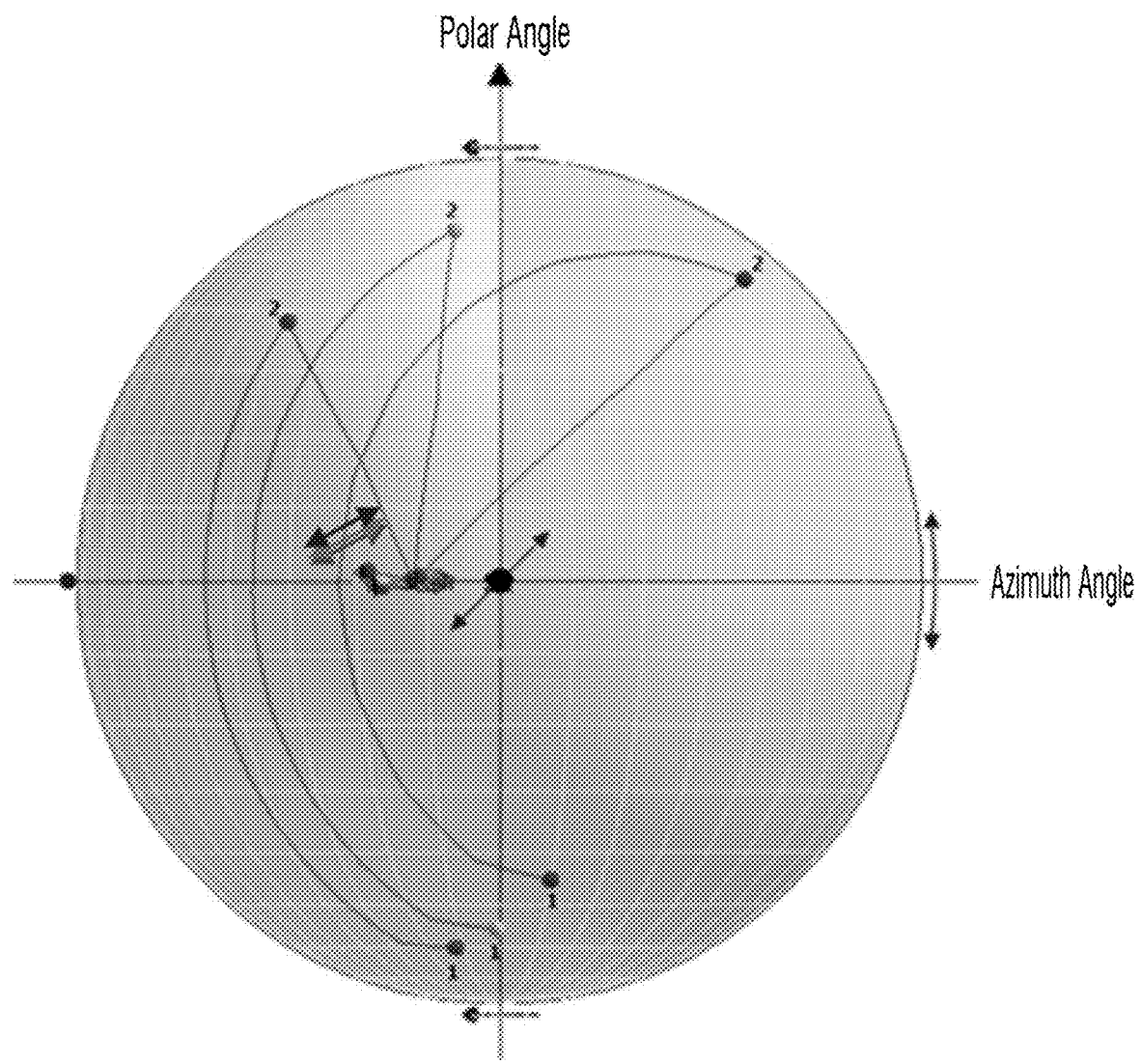
FIG. 11 is a view showing a polarization state according to an azimuth angle and a polar angle of light passing through an impact absorbing layer according to an embodiment.

FIG. 11 is a view showing a polarization state according to an azimuth angle and a polar angle of light passing through an impact absorbing layer according to an embodiment.

Referring to FIG. 11, it can be seen that in the display device 10 according to the embodiment in which the angle between the phase retardation axis P_AXIS and the absorption axis A_AXIS is in a range of about −10 degrees to about 10 degrees, even if the linearly polarized light transmitted through the polarization layer 215 and provided from the display panel (see '100' in FIG. 3) passes through the impact absorbing layer 220, a substantially linear polarization state may be maintained, and thus, non-uniformity of white angular dependency (WAD) may hardly occur between the lights of the red wavelength (about 630~780 nm), the green wavelength (495~570 nm) and the blue wavelength (450~495 nm).

Figure 13:
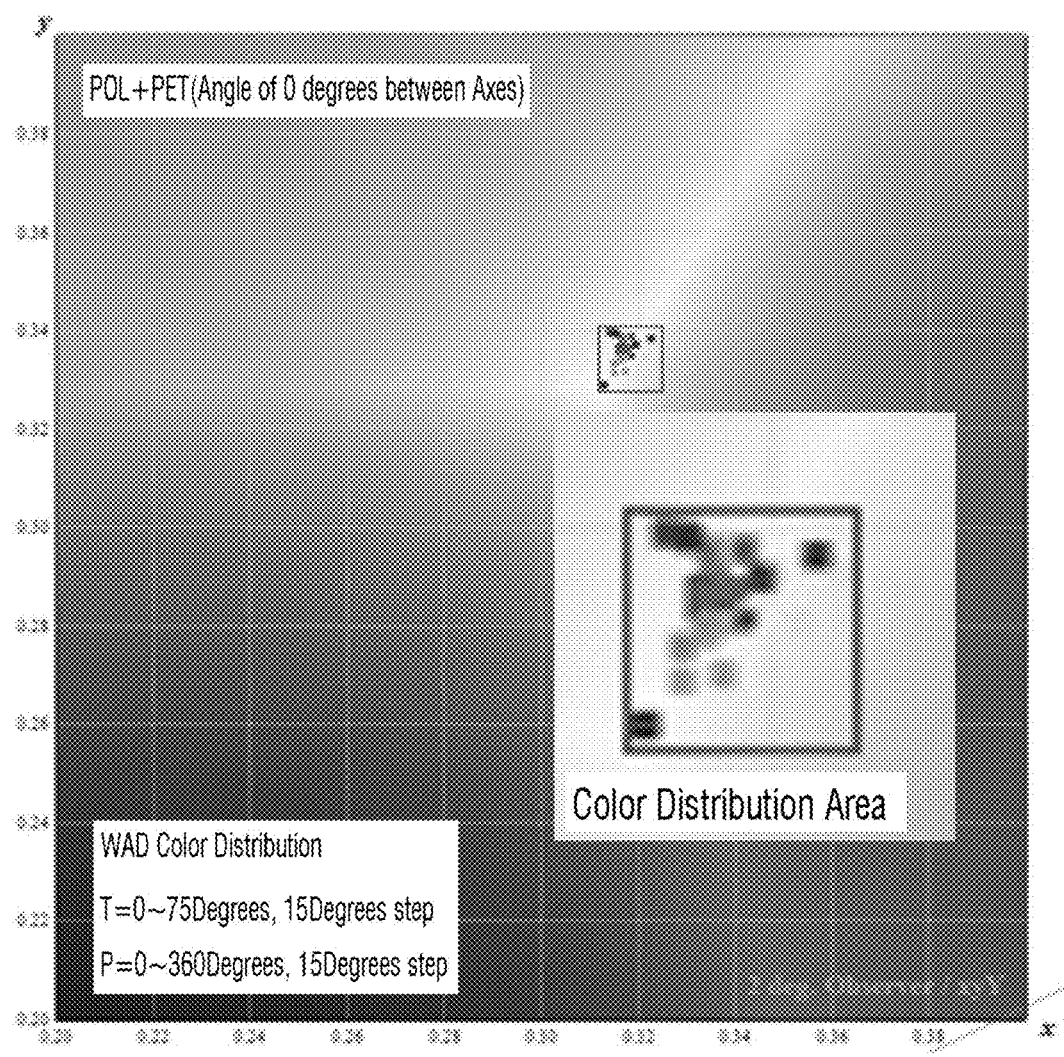
FIG. 13 is a graph that shows color coordinates in the relationship between the absorption axis of the linear polarization layer and the phase retardation axis of the impact absorbing layer according to an embodiment.
Figure 14:
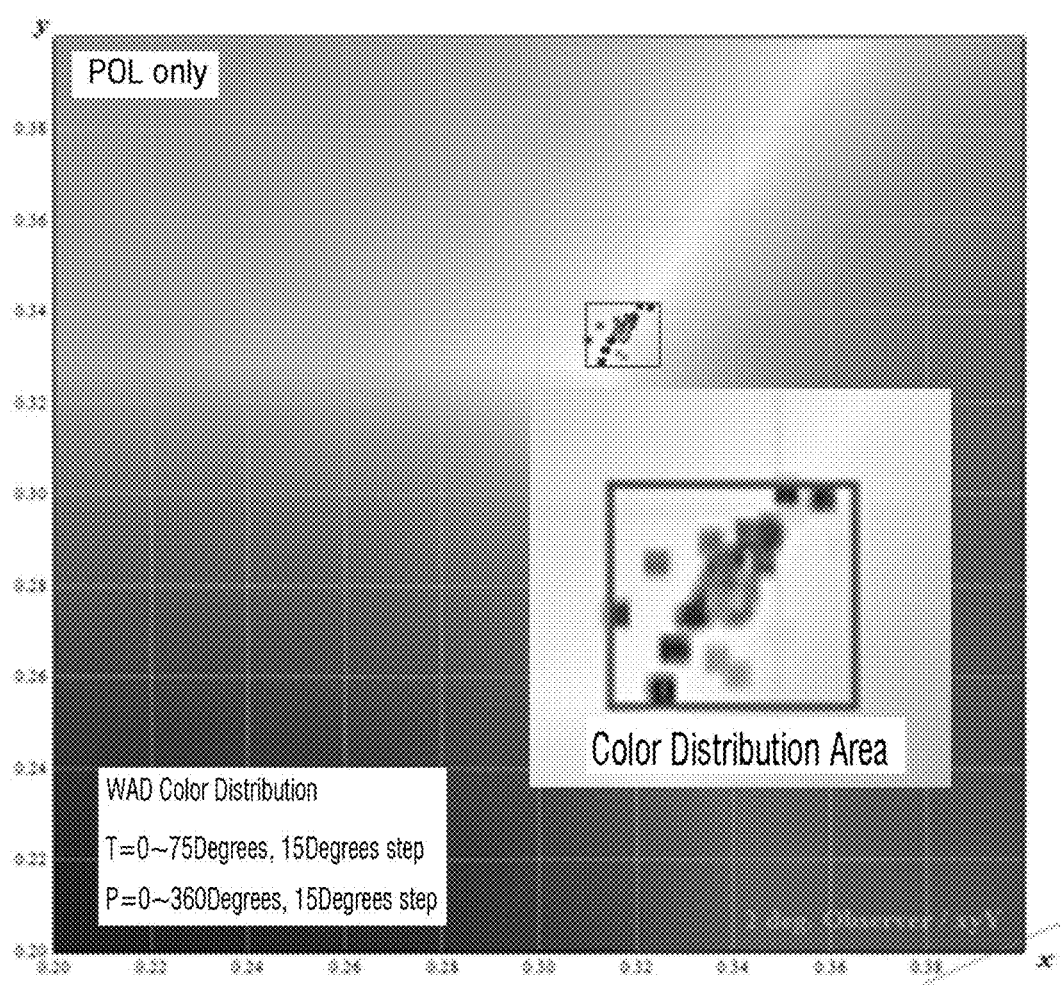
FIG. 14 is a graph that shows color coordinates when the impact absorbing layer is omitted.

FIG. 12 shows color coordinates when an angle between the absorption axis of the linear polarization layer and the phase retardation axis of the impact absorbing layer is 45 degrees. FIG. 13 shows color coordinates in the relationship between the absorption axis of the linear polarization layer and the phase retardation axis of the impact absorbing layer according to the embodiment. FIG. 14 shows color coordinates when the impact absorbing layer is omitted.

Referring to FIGS. 12 to 14, it can be seen that in the display device according to the embodiment in which the angle between the phase retardation axis P_AXIS and the absorption axis A_AXIS is in a range of about −10 degrees to about 10 degrees, the color (red, green and blue) distribution area is smaller than that of the sample (FIG. 12) in which the angle between the phase retardation axis P_AXIS and the absorption axis A_AXIS is about 45 degrees. For example, in the display device according to the embodiment in which the angle between the phase retardation axis P_AXIS and the absorption axis A_AXIS is in a range of about −10 degrees to about 10 degrees, the color (red, green and blue) distribution area may be about 49.8% smaller than that of the sample (FIG. 12) in which the angle between the phase retardation axis P_AXIS and the absorption axis A_AXIS is about 45 degrees.

It was confirmed that the display device according to the embodiment in which the angle between the phase retardation axis P_AXIS and the absorption axis A_AXIS is in a range of about −10 degrees to about 10 degrees has substantially a same color (red, green and blue) distribution area as a display device having a stacked structure in which the impact absorbing layer is omitted.

Figure 15:
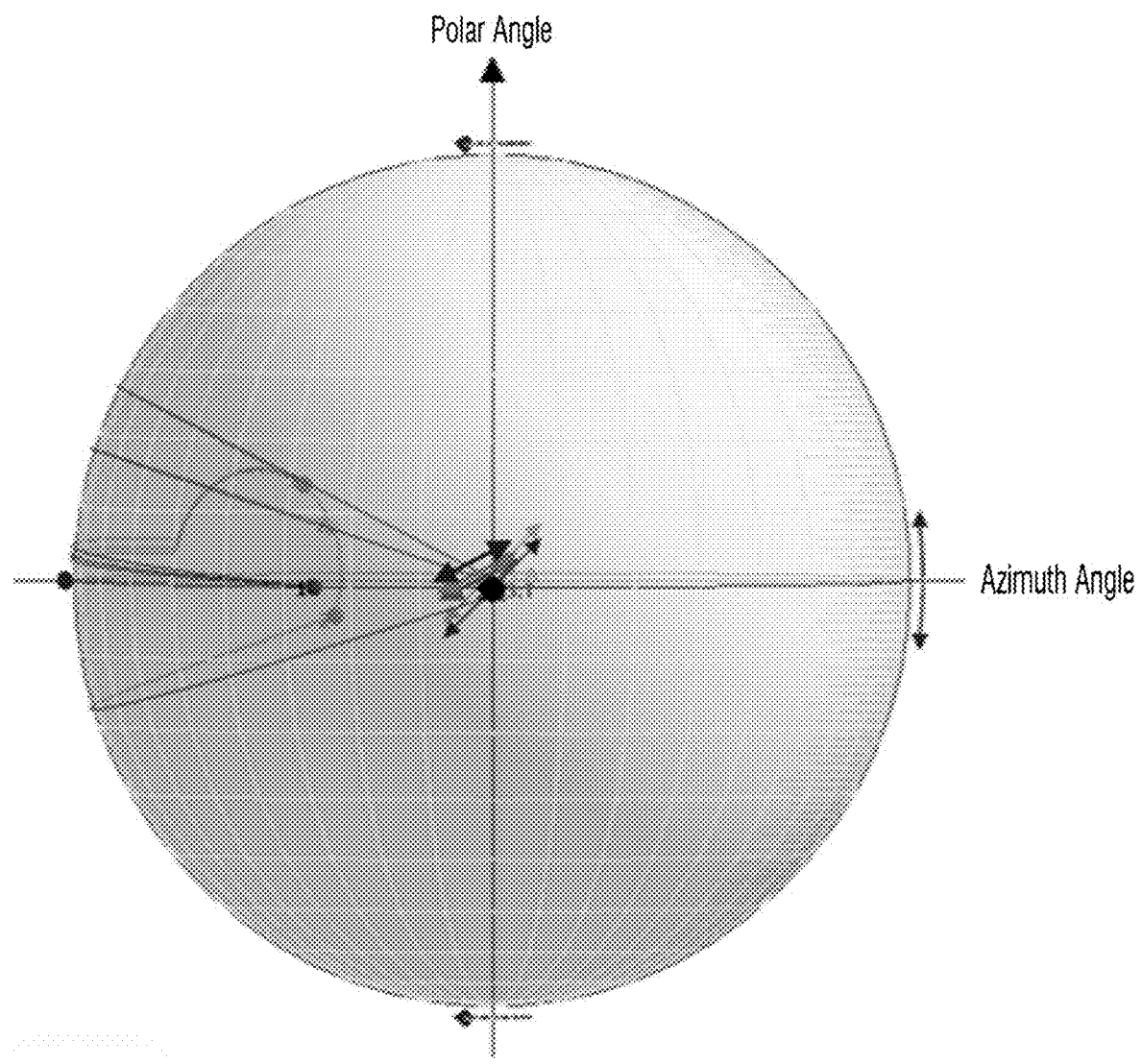
FIG. 15 is a view showing a relationship between a phase retardation axis of an impact absorbing layer and an absorption axis of a linear polarization layer according to another embodiment.
Figure 16:
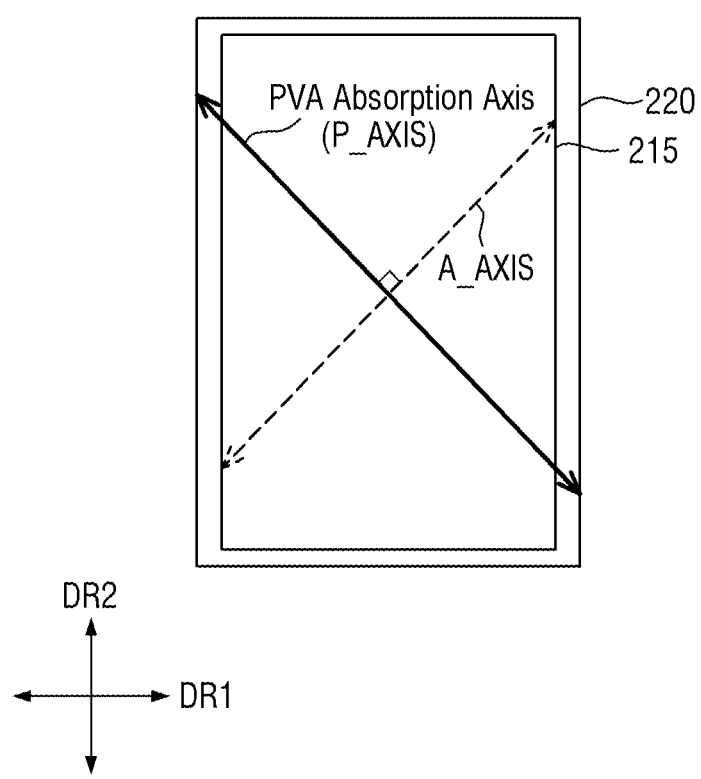
FIG. 16 is a plan view showing a polarization state according to an azimuth angle and a polar angle of light passing through an impact absorbing layer according to another embodiment.

FIG. 15 is a view showing a relationship between a phase retardation axis of an impact absorbing layer and an absorption axis of a linear polarization layer according to another embodiment. FIG. 16 is a plan view showing a polarization state according to an azimuth angle and a polar angle of light passing through an impact absorbing layer according to another embodiment.

Referring to FIGS. 15 and 16, the polarization layer 215 of the display device 10 according to the embodiment may have the absorption axis A_AXIS extending in a direction between the first direction DR1 and the second direction DR2, and the impact absorbing layer 220 may have the phase retardation axis P_AXIS extending in a direction between the first direction DR1 and the second direction DR2.

The absorption axis A_AXIS extends in the direction between the first direction DR1 and the second direction DR2, thereby allowing the light transmitted through the polarization layer 215 to reach a user wearing a device with linear polarization in a direction parallel to, e.g., the first direction DR1 or the second direction DR2. For example, the absorption axis A_AXIS may have an between in a range of about 40 degrees to about 60 degrees with respect to the first direction DR1, but is not limited thereto.

The angle between the phase retardation axis P_AXIS and the absorption axis A_AXIS may be in a range of about 80 degrees to about 100 degrees. For example, the angle between the phase retardation axis P_AXIS and the absorption axis A_AXIS may be about 90 degrees. For example, the direction of the phase retardation axis P_AXIS and the direction of the absorption axis A_AXIS may be orthogonal to each other.

When the angle between the phase retardation axis P_AXIS and the absorption axis A_AXIS is in a range of about 80 degrees to about 100 degrees, even if the linearly polarized light transmitted through the polarization layer 215 and provided from the display panel (see '100' in FIG. 3) passes through the impact absorbing layer 220, a substantially linear polarization state may be maintained.

As described above, the lights of the red wavelength (about 630~780 nm), the green wavelength (495~570 nm) and the blue wavelength (450~495 nm) may be provided in an outward direction from the display panel 100. The lights of the red wavelength (about 630~780 nm), the green wavelength (495~570 nm) and the blue wavelength (450~495 nm) from the display panel 100 may have different phase difference changes because the refractive index in the other direction, which is the direction of the second stretching (TD stretching), is greater than the refractive index in the one direction, which is the direction of the first stretching (MD stretching), thereby causing the phase difference RO, as described above. The lights of the red wavelength (about 630~780 nm), the green wavelength (495~570 nm) and the blue wavelength (450~495 nm) having different phase difference changes may have different polarization states (polarization state difference between them).

However, as in the embodiment, when the angle between the phase retardation axis P_AXIS and the absorption axis A_AXIS is in a range of about 80 degrees to about 100 degrees, even if the linearly polarized light transmitted through the polarization layer 215 and provided from the display panel (see '100' in FIG. 3) passes through the impact absorbing layer 220, a substantially linear polarization state may be maintained.

Accordingly, the lights of the red wavelength (about 630~780 nm), the green wavelength (495~570 nm) and the blue wavelength (450~495 nm) not having different polarization states may have substantially a same reflectance, and thus, may have a same transmittance. Therefore, the lights of the red wavelength (about 630~780 nm), the green wavelength (495~570 nm) and the blue wavelength (450~495 nm) may have different transmittances, thereby preventing non-uniformity of white angular dependency (WAD) from occurring between the lights of the red wavelength (about 630~780 nm), the green wavelength (495~570 nm) and the blue wavelength (450~495 nm) seen by external users.

Referring to FIG. 16, it can be seen that in the display device 10 according to the embodiment in which the angle between the phase retardation axis P_AXIS and the absorption axis A_AXIS is in a range of about 80 degrees to about 100 degrees, even if the linearly polarized light transmitted through the polarization layer 215 and provided from the display panel (see '100' in FIG. 3) passes through the impact absorbing layer 220, a substantially linear polarization state may be maintained, and thus, non-uniformity of white angular dependency (WAD) may hardly occur between the lights of the red wavelength (about 630~780 nm), the green wavelength (495~570 nm) and the blue wavelength (450~495 nm).

Figure 17:
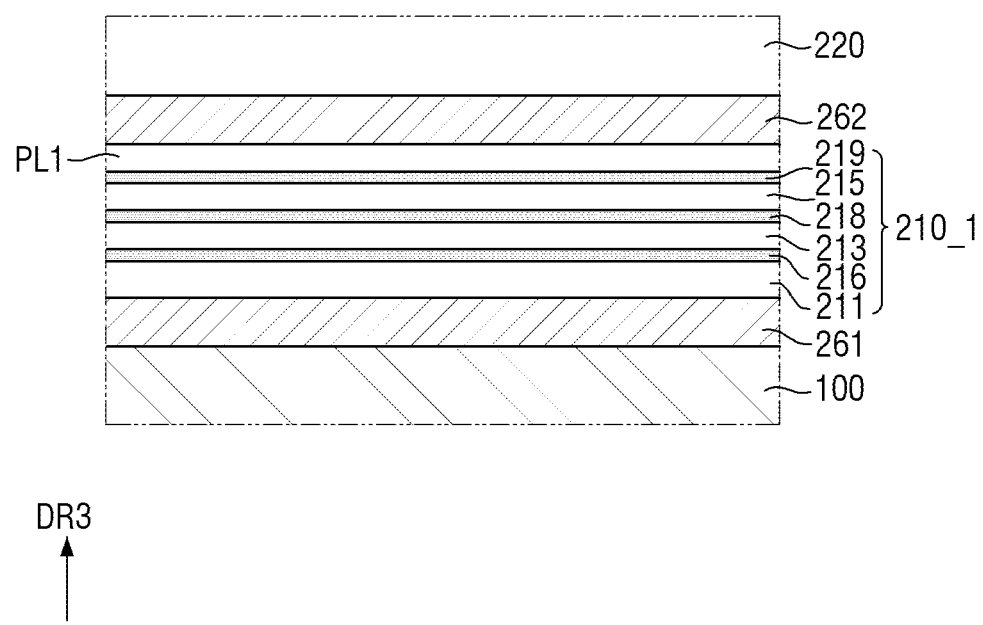
FIG. 17 is a schematic cross-sectional view of a polarizing member according to another embodiment.

FIG. 17 is a schematic cross-sectional view of a polarizing member according to another embodiment.

Referring to FIG. 17, a polarizing member 210_1 according to the embodiment is different from the polarizing member 210 according to the embodiment in that the coupling member 217 and the second polarization protection layer PL2 shown in FIG. 6 are omitted.

Thus, in the polarizing member 210_1 according to the embodiment, the coupling member 217 and the second polarization protection layer PL2 shown in FIG. 6 may be omitted.

The coupling member 218 may be disposed between the polarization layer 215 and the second phase retardation layer 213. The polarization layer 215 and the second phase retardation layer 213 may be attached to each other through the coupling member 218.

Other descriptions have been made with reference to FIG. 6, and thus, a redundant description will be omitted.

Although embodiments of the invention have been disclosed for illustrative purposes, those skilled in the art will appreciate that various modifications, additions and substitutions are possible, without departing from the scope and spirit of the invention as disclosed in the claims.

What is claimed is:
1. A display device comprising:
a display panel including:
   a surface at a front side of the display panel; and
   another surface at a rear side of the display panel;
a front stacked structure disposed on the surface of the display panel; and
a rear stacked structure disposed on the another surface of the display panel, wherein
the front stacked structure includes:
   a polarizing member disposed on the surface of the display panel; and
   an impact absorbing layer disposed on the polarizing member,
the polarizing member includes:
   at least one phase retardation layer disposed on the surface of the display panel;
   a polarization layer disposed between the at least one phase retardation layer and the impact absorbing layer; and
   a first polarization protection layer disposed between the polarization layer and the impact absorbing layer, and
an angle between an absorption axis of the polarization layer and a phase retardation axis of the impact absorbing layer is in a range of about −10 degrees to about 10 degrees.

2. The display device of claim 1, wherein
the polarization layer has a rectangular shape having long sides extending along a first direction and short sides extending along a second direction intersecting the first direction, and
the absorption axis of the polarization layer extends in a direction between the first direction and the second direction.

3. The display device of claim 2, wherein the impact absorbing layer is formed through a film stretching process.

4. The display device of claim 3, wherein the film stretching process includes:
a first stretching for stretching the impact absorbing layer along one direction; and
a second stretching for stretching the impact absorbing layer along another direction.

5. The display device of claim 4, wherein a first elongation rate of the first stretching is less than a second elongation rate of the second stretching.

6. The display device of claim 5, wherein a refractive index of the impact absorbing layer in the other direction is greater than a refractive index of the impact absorbing layer in the one direction.

7. The display device of claim 6, wherein the phase retardation axis of the impact absorbing layer is the same as the another direction of the second stretching in the film stretching process.

8. The display device of claim 3, wherein
the at least one phase retardation layer includes a first phase retardation layer disposed between the surface of the display panel and the polarization layer, and
the first phase retardation layer retards a phase of incident light by $\lambda/4$, where $\lambda$ is a wavelength of the incident light.

9. The display device of claim 8, wherein
the at least one phase retardation layer includes a second phase retardation layer disposed between the first phase retardation layer and the polarization layer, and
the second phase retardation layer retards a phase of incident light by $\lambda/2$.

10. The display device of claim 3, wherein the polarizing member further includes a second polarization protection layer disposed between the polarization layer and the phase retardation layer.

11. The display device of claim 10, wherein the front stacked structure further includes a cover window disposed on the impact absorbing layer.

12. The display device of claim 10, wherein the rear stacked structure includes:
a lower flexible film disposed on the another surface of the display panel; and
a cushion layer spaced apart from the display panel, the lower flexible film being disposed between the cushion layer and the display panel.

13. The display device of claim 12, wherein the rear stacked structure further includes at least one metal plate spaced apart from the lower flexible film, the cushion layer being disposed between the at least one metal plate and the lower flexible film.

14. The display device of claim 13, wherein the display device further includes:
   a folding area;
   a first unfolding area at a side of the folding area in the first direction; and
   a second unfolding area at another side of the folding area in the first direction.

15. The display device of claim 14, wherein the at least one metal plate includes:
   a first metal plate disposed in the first unfolding area; and
   a second metal plate disposed in the second unfolding area,
   wherein the first metal plate and the second metal plate are spaced apart from each other, and the folding area is disposed between the first metal plate and the second metal plate.

16. A display device comprising:
   a display panel including:
      a surface at a front side of the display panel; and
      another surface at a rear side of the display panel;
   a front stacked structure disposed on the surface of the display panel; and
   a rear stacked structure disposed on the another surface of the display panel, wherein
   the front stacked structure includes:
      a polarizing member disposed on the surface of the display panel; and
      an impact absorbing layer disposed on the polarizing member,
   the polarizing member includes:
      at least one phase retardation layer disposed on the surface of the display panel;
      a polarization layer disposed between the at least one phase retardation layer and the impact absorbing layer; and
      a polarization protection layer disposed between the polarization layer and the impact absorbing layer, and
   an angle between an absorption axis of the polarization layer and a phase retardation axis of the impact absorbing layer is in a range of about 80 degrees to about 100 degrees.

17. The display device of claim 16, wherein
   the polarization layer has a rectangular shape having long sides extending along a first direction and short sides extending along a second direction intersecting the first direction, and
   the absorption axis of the polarization layer extends in a direction between the first direction and the second direction.

18. The display device of claim 17, wherein the impact absorbing layer is formed through a film stretching process.

19. The display device of claim 18, wherein
   the film stretching process includes:
      a first stretching for stretching the impact absorbing layer along one direction; and
      a second stretching for stretching the impact absorbing layer along another direction, and
   a first elongation rate of the first stretching is less than a second elongation rate of the second stretching.

20. The display device of claim 19, wherein
   a refractive index of the impact absorbing layer in the other direction is greater than a refractive index of the impact absorbing layer in the one direction, and
   the phase retardation axis of the impact absorbing layer is the same as the another direction of the second stretching in the film stretching process.

* * * * *